(12) United States Patent
Ishizaka et al.

(10) Patent No.: US 11,306,792 B2
(45) Date of Patent: Apr. 19, 2022

(54) AUTOMATIC TRANSMISSION

(71) Applicant: Mazda Motor Corporation, Hiroshima (JP)

(72) Inventors: Tomotaka Ishizaka, Aki-gun (JP); Norio Iwashita, Aki-gun (JP); Kensuke Ueda, Aki-gun (JP); Masanori Sasaki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/029,412

(22) Filed: Sep. 23, 2020

(65) Prior Publication Data

US 2021/0131513 A1 May 6, 2021

(30) Foreign Application Priority Data

Oct. 30, 2019 (JP) .............................. JP2019-197716

(51) Int. Cl.
*F16H 45/02* (2006.01)
*F16D 67/04* (2006.01)
(Continued)

(52) U.S. Cl.
CPC ............. *F16D 67/04* (2013.01); *F16D 25/10* (2013.01); *F16H 57/023* (2013.01); *F16H 57/043* (2013.01); *F16H 57/0473* (2013.01); *F16H 63/3026* (2013.01); *F16D 25/0638* (2013.01); *F16D 2121/04* (2013.01);
(Continued)

(58) Field of Classification Search
CPC .. F16D 25/10; F16D 67/02–04; F16D 57/023; F16D 57/0424–043; F16D 57/0473; F16D 2057/02047
See application file for complete search history.

(56) References Cited

U.S. PATENT DOCUMENTS 1,864,126 A * 6/1932 Ferris ...................... F16D 67/04
192/17 A
2,887,199 A * 5/1959 Funk ...................... F16D 25/10
477/112
(Continued)

FOREIGN PATENT DOCUMENTS

JP 2010006190 A * 1/2010
JP 2018115741 A 7/2018

*Primary Examiner* — Charles A Fox
*Assistant Examiner* — Farhana Pervin
(74) *Attorney, Agent, or Firm* — Alleman Hall Creasman & Tuttle LLP

(57) ABSTRACT

An automatic transmission is provided, which includes a transmission case having a vertical wall part, a clutch disposed on a first side of the vertical wall part in an axial direction, a given component disposed on the second side of the vertical wall part, and a sleeve having a cylindrical body and a flange part coupled to the second side of the vertical wall part and disposed radially inward of the given component. The hydraulic fluid is supplied to the clutch from radially inward of the clutch through the vertical wall part. An oil supply passage is configured to supply the hydraulic fluid to the radially inward of the clutch through a first oil passage extending in the axial direction via a coupling part between the vertical wall part and the flange part, a second oil passage inside the flange part, and a third oil passage inside the cylindrical body.

18 Claims, 10 Drawing Sheets

(51) Int. Cl.
*F16H 63/30* (2006.01)
*F16H 57/023* (2012.01)
*F16H 57/04* (2010.01)
*F16D 25/10* (2006.01)
F16D 25/0638 (2006.01)
F16D 121/04 (2012.01)
F16H 57/02 (2012.01)

(52) U.S. Cl.
CPC ...... *F16D 2300/06* (2013.01); *F16H 57/0484* (2013.01); *F16H 2057/02047* (2013.01); *F16H 2200/006* (2013.01); *F16H 2200/2012* (2013.01); *F16H 2200/2043* (2013.01)

(56) References Cited

U.S. PATENT DOCUMENTS

| | | | | |
|---|---|---|---|---|
| 3,735,656 | A * | 5/1973 | Strandell | B23D 23/00 |
| | | | | 83/198 |
| 2007/0213163 | A1* | 9/2007 | Combes | B60K 6/26 |
| | | | | 475/100 |
| 2010/0320050 | A1* | 12/2010 | Fujita | F16D 21/06 |
| | | | | 192/48.8 |
| 2012/0132498 | A1* | 5/2012 | Hauck | F16D 25/082 |
| | | | | 192/48.601 |
| 2019/0257370 | A1* | 8/2019 | Yamakawa | F16D 65/186 |
| 2019/0257376 | A1* | 8/2019 | Yamakawa | F16D 55/40 |
| 2019/0308496 | A1* | 10/2019 | Reimnitz | B60K 6/48 |

* cited by examiner

|  | CL1 | CL2 | CL3 | BR1 | BR2 |
|---|---|---|---|---|---|
| 1ST GEAR | ○ |  |  | ○ | ○ |
| 2ND GEAR |  | ○ |  | ○ | ○ |
| 3RD GEAR | ○ | ○ |  |  | ○ |
| 4TH GEAR |  | ○ | ○ |  | ○ |
| 5TH GEAR | ○ |  | ○ |  | ○ |
| 6TH GEAR | ○ | ○ | ○ |  |  |
| 7TH GEAR | ○ |  | ○ | ○ |  |
| 8TH GEAR |  | ○ | ○ | ○ |  |
| REVERSE GEAR |  |  | ○ | ○ | ○ |

FIG. 2

AUTOMATIC TRANSMISSION

TECHNICAL FIELD

The present disclosure relates to an automatic transmission mounted on a vehicle, and particularly belongs to a technical field of an automatic transmission for a vehicle.

BACKGROUND OF THE DISCLOSURE

Generally, an automatic transmission mounted on a vehicle includes a plurality of planetary gear sets (planetary gear mechanisms) and a plurality of friction engagement elements such as clutches and brakes. The automatic transmission selectively engages the plurality of friction engagement elements under a hydraulic control to achieve a plurality of gear stages with different gear ratios.

For example, JP2018-115741A discloses an automatic transmission provided with four planetary gear sets, and five friction engagement elements having three clutches and two brakes. The automatic transmission realizes eight forward gear stages and one reverse gear stage by selectively engaging three of the friction engagement elements.

In the automatic transmission having the plurality of friction engagement elements as disclosed in JP2018-115741A, a plurality of clutches may be lined up in the axial direction on an anti-drive-source side (opposite from a drive-source side) of a vertical wall part extending radially in a transmission case, and a brake may be disposed on the drive-source side of the vertical wall part of the transmission case.

When such an automatic transmission supplies hydraulic fluid to the plurality of clutches, a sleeve coupled to the vertical wall part of the transmission case may be used and the hydraulic fluid is supplied from a valve body disposed below the transmission case. The hydraulic fluid is then supplied to the plurality of clutches from radially inward through the vertical wall part of the transmission case and the sleeve.

For example, such an automatic transmission 200 is illustrated in FIG. 10. This automatic transmission 200 uses a sleeve 203 coupled to a vertical wall part 202 of a transmission case 201, and supplies hydraulic fluid to clutches 210, 220, and 230 from radially inward through the vertical wall part 202 of the transmission case 201 and the sleeve 203.

In this automatic transmission 200, the clutches 210, 220, and 230 are disposed on an anti-drive-source side of the vertical wall part 202 of the transmission case 201, and a brake 240 is disposed on a drive-source side of the vertical wall part 202. The sleeve 203 which constitutes oil supply passages 250 for supplying the hydraulic fluid to the clutches 210, 220, and 230, includes a cylindrical part 204, and a flange part 205 which extends radially outward from the cylindrical part 204 and is coupled to the anti-drive-source side of the vertical wall part 202.

The oil supply passage 250 for supplying the hydraulic fluid to the clutches 210, 220, and 230 from the vertical wall part 202 includes a first oil passage 205a which radially extends inside the flange part 205 via a coupling part 206 between the vertical wall part 202 and the flange part 205, and a second oil passage 205b which axially extends inside the cylindrical part 204. The hydraulic fluid is supplied from radially inward to hydraulic chambers 211, 221, and 231 of the clutches 210, 220, and 230 through the first oil passage 205a and the second oil passage 205b.

In the automatic transmission 200, the flange part 205 of the sleeve 203 is disposed on one side of the vertical wall part 202 of the transmission case 201 in the axial direction, and the brake 240 is disposed on the other side of the vertical wall part 202. The brake 240 and the flange part 205 are disposed on each side of the vertical wall part 202. Therefore, the axial dimension of the automatic transmission 200 is large.

SUMMARY OF THE DISCLOSURE

Therefore, the present disclosure is made in view of the above situation, and one purpose thereof is to provide an axially-downsized automatic transmission having a clutch disposed on a first side of a vertical wall part of a transmission case in the axial direction, which supplies hydraulic fluid to the clutch from radially inward through the vertical wall part.

According to one aspect of the present disclosure, an automatic transmission is provided, which includes a transmission case having a vertical wall part, a clutch disposed on a first side of the vertical wall part in an axial direction of the transmission case, a given component disposed on a second side of the vertical wall part in the axial direction, a sleeve having a cylindrical body extending in the axial direction to the first side and to the second side of the vertical wall part, at a location radially inward of the vertical wall part, and a flange part extending radially outward from the cylindrical body and coupled to the vertical wall part from the second side in the axial direction, the flange part being disposed radially inward of the given component, and an oil supply passage through which hydraulic fluid is supplied to the clutch. The hydraulic fluid is supplied to the clutch from radially inward of the clutch through the vertical wall part. The oil supply passage is configured to supply the hydraulic fluid from the vertical wall part to the radially inward of the clutch through a first oil passage extending in the axial direction via a coupling part between the vertical wall part and the flange part, a second oil passage inside the flange part, connected to the first oil passage and extending in the radial direction, and a third oil passage inside the cylindrical body, connected to the second oil passage and extending in the axial direction.

According to this configuration, the automatic transmission includes the sleeve having the cylindrical body extending in the axial direction, radially inward of the vertical wall part of the transmission case, and the flange part coupled to the second side of the vertical wall part in the axial direction. The sleeve constitutes the oil supply passage which supplies the hydraulic fluid to the clutch and the flange part is disposed radially inward of the given component.

Thus, compared to a case where the flange part of the sleeve which constitutes the oil supply passage which supplies the hydraulic fluid from radially inward to the clutch is disposed on the first side of the transmission case in the axial direction, the flange part is disposed so as to overlap in the axial direction of the transmission case with the given component which is disposed on the second side of the vertical wall part of the transmission case in the axial direction, thereby reducing the axial dimension. Therefore, the automatic transmission in which the clutch is disposed on the first side of the vertical wall part of the transmission case in the axial direction can be downsized in the axial direction, while supplying the hydraulic fluid from radially inward to the clutch through the vertical wall part.

The given component may be a brake.

According to this configuration, in the automatic transmission in which the clutch is disposed on the first side of the vertical wall part of the transmission case in the axial direction and the brake is disposed on the second side of the vertical wall part in the axial direction, the flange part of the sleeve is disposed so as to overlap with the brake in the axial direction, thereby reducing the axial dimension.

The sleeve may include a first sleeve having a first cylindrical body constituting an outer circumferential side of the cylindrical body, and the flange part, and a second sleeve having a second cylindrical body constituting an inner circumferential side of the cylindrical body and attached to an inner surface of the first cylindrical body. The third oil passage may be formed between the inner surface of the first cylindrical body and an outer surface of the second cylindrical body.

According to this configuration, the third oil passage is formed between the inner surface of the first cylindrical body and the outer surface of the second cylindrical body by attaching the second sleeve to the first sleeve, and therefore, the third oil passage can be formed comparatively easily. Particularly, when a plurality of third oil passages are formed in the sleeve, the plurality of third oil passages can be formed comparatively easily.

The clutch may include a plurality of clutches disposed on the first side of the vertical wall part in the axial direction. The oil supply passage may include a plurality of oil supply passages through which hydraulic fluid for engagement is supplied to the plurality of clutches, respectively.

According to this configuration, the hydraulic fluid for engagement can be supplied from radially inward to the plurality of clutches disposed on the first side of the vertical wall part of the transmission case in the axial direction, while downsizing the automatic transmission in the axial direction.

The clutch may include a plurality of clutches disposed on the first side of the vertical wall part in the axial direction. The oil supply passage may include an oil supply passage through which hydraulic fluid for lubrication is supplied to the plurality of clutches.

According to this configuration, the hydraulic fluid for lubrication can be supplied from radially inward to the plurality of clutches disposed on the first side of the vertical wall part of the transmission case in the axial direction, while downsizing the automatic transmission in the axial direction.

A plate configured to receive a return spring of a brake that is the given component may be coupled to the vertical wall part, together with the sleeve, by a coupling member configured to couple the sleeve.

According to this configuration, since the coupling member, which couples the sleeve, also couples the plate which receives the return spring of the brake to the vertical wall part of the transmission case, it is not necessary to separately provide a coupling member which couples the plate which receives the return spring, and the number of components and the number of assembling processes can be reduced.

BRIEF DESCRIPTION OF DRAWINGS

FIG. 2 is an engagement table of friction engagement elements of the automatic transmission.

DETAILED DESCRIPTION OF THE DISCLOSURE

Hereinafter, one embodiment of the present disclosure is described with reference to the accompanying drawings.

Figure 1:
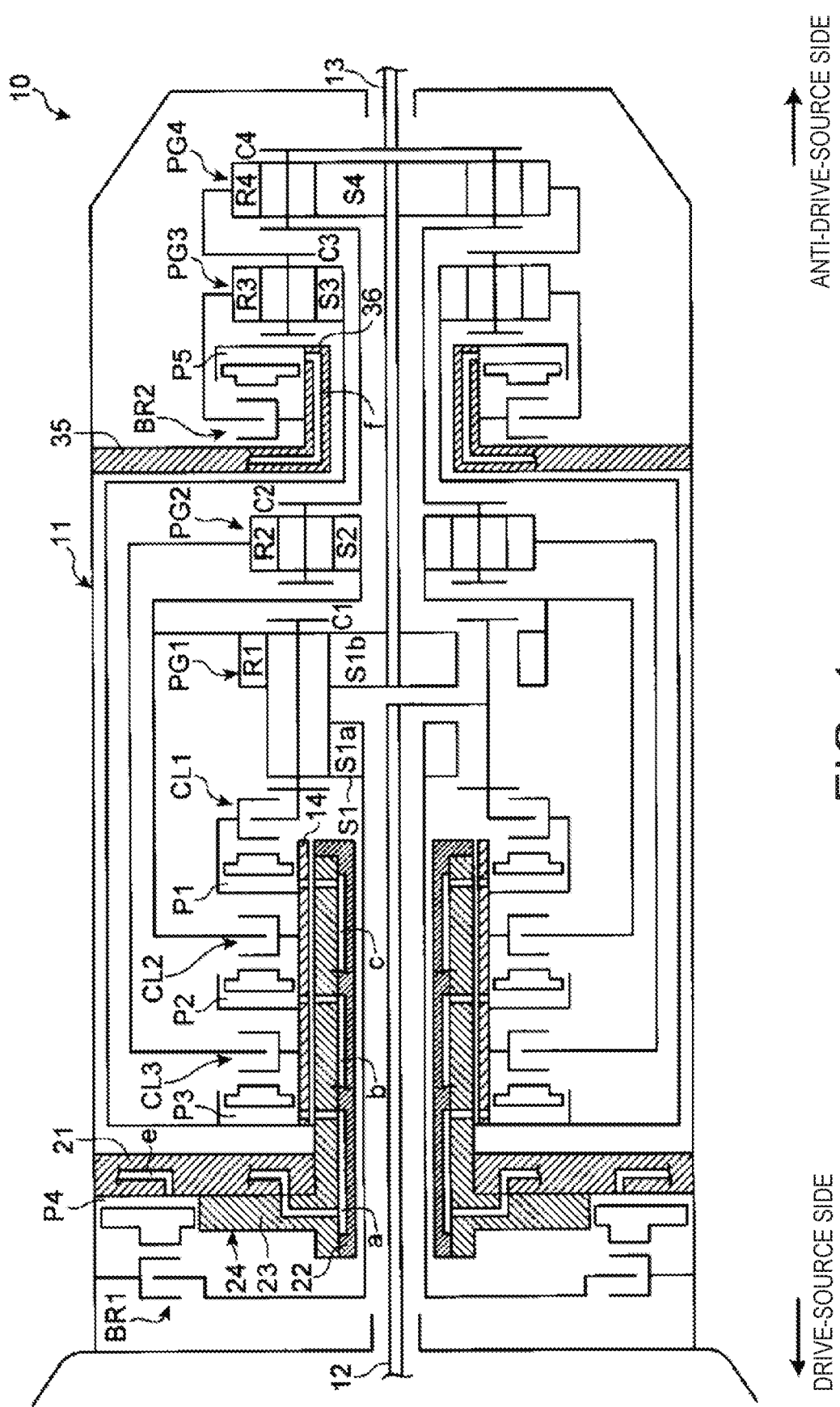
FIG. 1 is a view schematically illustrating a configuration of an automatic transmission according to one embodiment of the present disclosure.

FIG. 1 is a view schematically illustrating a configuration of an automatic transmission 10 according to one embodiment of the present disclosure. This automatic transmission 10 is coupled to a drive source, such as an engine, without intervention of a hydraulic power transmission, such as a torque converter. The automatic transmission 10 has, inside a transmission case 11, an input shaft 12 coupled to the drive source and disposed at a drive-source side (left side in this drawing), and an output shaft 13 disposed at an anti-drive-source side (right side in this drawing). The automatic transmission 10 is of a longitudinally oriented type for front-engine rear-drive vehicles in which the input shaft 12 and the output shaft 13 are disposed coaxially.

On the axial center of the input shaft 12 and the output shaft 13, the first, second, third, and fourth planetary gear sets (hereinafter, simply referred to as "first, second, third, and fourth gear sets") PG1, PG2, PG3, and PG4 are disposed from the drive-source side.

Inside the transmission case 11, a first clutch CL1 is disposed at the drive-source side of the first gear set PG1, a second clutch CL2 is disposed at the drive-source side of the first clutch CL1, and a third clutch CL3 is disposed at the drive-source side of the second clutch CL2. A first brake BR1 is disposed at the drive-source side of the third clutch CL3, and a second brake BR2 is disposed at the drive-source side of the third gear set PG3 and at the anti-drive-source side of the second gear set PG2.

Each of the first, second, third, and fourth gear sets PG1, PG2, PG3, and PG4 is of a single pinion type in which pinions supported by a carrier directly mesh with a sun gear and a ring gear. The first, second, third, and fourth gear sets PG1, PG2, PG3, and PG4 have, as rotating elements, sun gears S1, S2, S3, and S4, ring gears R1, R2, R3, and R4, and carriers C1, C2, C3, and C4, respectively.

The first gear set PG1 is of a double sun gear type in which the sun gear S1 is divided into two in the axial direction. The sun gear S1 has a first sun gear S1a disposed at the drive-source side and a second sun gear S1b disposed at the anti-drive-source side. The first and second sun gears S1a and S1b have the same number of teeth, and mesh with the same pinion supported by the carrier C1. Therefore, the first and the second sun gears S1a and S1b always rotate identically.

In the automatic transmission 10, the sun gear S1 of the first gear set PG1 (in detail, the second sun gear S1b) and the sun gear S4 of the fourth gear set PG4 are always coupled to each other, the ring gear R1 of the first gear set PG1 and the sun gear S2 of the second gear set PG2 are always coupled to each other, the carrier C2 of the second gear set PG2 and the carrier C4 of the fourth gear set PG4 are always coupled to each other, and the carrier C3 of the third gear set PG3 and the ring gear R4 of the fourth gear set PG4 are always coupled to each other.

The input shaft 12 is always coupled to the carrier C1 of the first gear set PG1 through between the first sun gear S1a and the second sun gear S1b, and the output shaft 13 is always coupled to the carrier C4 of the fourth gear set PG4.

The first clutch CL1 is disposed between the input shaft 12 and the carrier C1 of the first gear set PG1, and the sun gear S3 of the third gear set PG3 to engage and disengage therebetween, the second clutch CL2 is disposed between the ring gear R1 of the first gear set PG1 and the sun gear S2 of the second gear set PG2, and the sun gear S3 of the third gear set PG3 to engage and disengage therebetween, and the third clutch CL3 is disposed between the ring gear R2 of the second gear set PG2 and the sun gear S3 of the third gear set PG3 to engage and disengage therebetween.

The first brake BR1 is disposed between the transmission case 11 and the sun gear S1 of the first gear set PG1 (in detail, the first sun gear S1a) to engage and disengage therebetween, and the second brake BR2 is disposed between the transmission case 11 and the ring gear R3 of the third gear set PG3 to engage and disengage therebetween.

The first, second, and third clutches CL1, CL2, and CL3 have hydraulic chambers P1, P2, and P3 defined by a cylinder and a piston fitted into the cylinder, respectively. When hydraulic fluid for engagement is supplied to the hydraulic chambers P1, P2, and P3 and the hydraulic pressure for engagement is supplied, the friction plates are engaged so that a pair of inner and outer rotating members are coupled to each other.

The first and second brakes BR1 and BR2 have hydraulic chambers P4 and P5 defined by a cylinder and a piston fitted into the cylinder, respectively. When hydraulic fluid for engagement is supplied to the hydraulic chambers P4 and P5 and hydraulic pressure for engagement is supplied, the friction plates are engaged and the rotating members of the first and the second brakes BR1 and BR2 are coupled to the transmission case 11.

A vertical wall part 21 is provided integrally with the transmission case 11 extending radially inward between the first brake BR1 and the third clutch CL3. A sleeve 24 having a cylindrical body 22 extending axially inside the vertical wall part 21 and a flange part 23 extending radially outward from the cylindrical body 22 are coupled to the vertical wall part 21. On an outer circumferential side at the anti-drive-source side of the cylindrical body 22 of the sleeve 24, a power transmission member 14 which couples an outer rotating member of the first clutch CL1, inner rotating members of the second and third clutches CL2 and CL3, and the sun gear S3 of the third gear set PG3 is disposed.

Oil supply passages a, b, and c which lead from a valve control unit disposed below the transmission case 11 to the hydraulic chambers P3, P2, and P1 of the third, second, and first clutches CL3, CL2, and CL1 are formed in the vertical wall part 21 of the transmission case 11 and the sleeve 24, respectively. An oil supply passage d which supplies hydraulic fluid for lubrication from the valve control unit to the friction plates of the third, second, and first clutches CL3, CL2, and CL1 is also formed in the vertical wall part 21 of the transmission case 11 and the sleeve 24. An oil supply passage e which leads from the valve control unit to the hydraulic chamber P4 of the first brake BR1 is also formed in the vertical wall part 21 of the transmission case 11.

A vertical wall part 35 is provided integrally with the transmission case 11 extending radially inward between the second brake BR2 and the second gear set PG2, and a cylindrical body 36 extending axially to the anti-drive-source side is provided at the inner circumferential side of the vertical wall part 35. An oil supply passage f which leads from the valve control unit to the hydraulic chamber P5 of the second brake BR2 is formed in the vertical wall part 35 and the cylindrical body 36 of the transmission case 11.

By the above structure, the automatic transmission 10 forms, first to eight gears in a D-range (Drive range) and a reverse gear in an R-range (Reverse range) as illustrated in FIG. 2, by a combination of engagement states of the first clutch CL1, the second clutch CL2, the third clutch CL3, the first brake BR1, and the second brake BR2.

In the automatic transmission 10, the third, second, and first clutches CL3, CL2, and CL1 are disposed at the anti-drive-source side of the vertical wall part 21 of the transmission case 11, and the first brake BR1 is disposed at the drive-source side of the vertical wall part 21 as one example of a given component. The hydraulic fluid is supplied from radially inward to the third, second, and first clutches CL3, CL2, and CL1 through the vertical wall part 21.

A structure of the vertical wall part 21 of the automatic transmission 10 according to this embodiment and the periphery thereof is described with reference to FIGS. 3 to 9.

Figure 3:
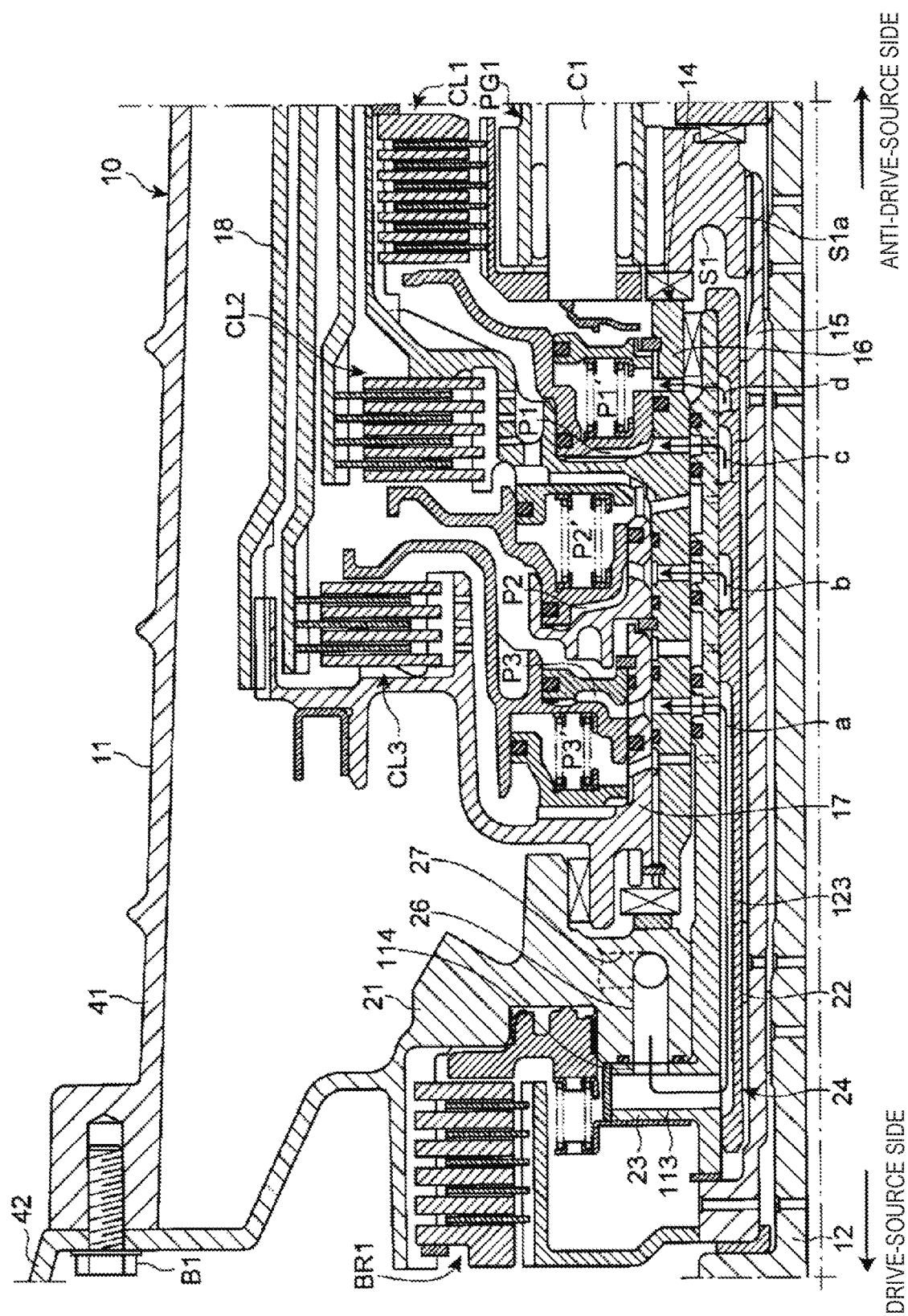
FIG. 3 is a cross-sectional view illustrating a vertical wall part of the automatic transmission and the periphery thereof

FIG. 3 is a cross-sectional view illustrating the vertical wall part of the automatic transmission and the periphery thereof. As illustrated in FIG. 3, the transmission case 11 includes a first case member 41 formed cylindrically and a second case member 42 formed cylindrically and disposed at the drive-source side of the first case member 41. The second case member 42 is fixed to the first case member 41 by using fastening bolts B1 as coupling members. The vertical wall part 21 of the transmission case 11 is comprised of the second case member 42.

The sleeve 24 formed cylindrically is coupled to the vertical wall part 21 of the transmission case 11. The sleeve 24 has the cylindrical body 22 extending axially to the anti-drive-source side and the drive-source side of the vertical wall part 21 radially inward of the vertical wall part 21, and the flange part 23 extending radially outward from the cylindrical body 22 and coupled to the drive-source side of the vertical wall part 21.

The sleeve 24 is disposed at the outer circumferential side of a power transmission member 15 which couples the first sun gear S1a of the first gear set PG1 and the rotating member of the first brake BR1. The power transmission member 15 is disposed at the outer circumferential side of the input shaft 12.

The power transmission member 14 which couples the outer rotating member of the first clutch CL1, the inner rotating members of the second and third clutches CL2 and CL3, and the sun gear S3 of the third gear set PG3 is disposed on the outer circumferential side at the anti-drive-source side of the cylindrical body 22 of the sleeve 24.

The power transmission member 14 includes a power transmission member 16 coupled to the outer rotating member of the first clutch CL1 and the inner rotating member of the second clutch CL2, a power transmission member 17 spline-engaged with the power transmission member 16, coupled to the inner rotating member of the third clutch CL3, and extending radially outward, and a power transmission member 18 spline-engaged with the power transmission member 17, coupled to the sun gear S3 of the third gear set PG3, and extending to the anti-drive-source side.

As described above, the third, second, and first clutches CL3, CL2, and CL1 are disposed at the anti-drive-source side of the vertical wall part 21 of the transmission case 11, and the first brake BR1 is disposed at the drive-source side of the vertical wall part 21.

Figure 4:
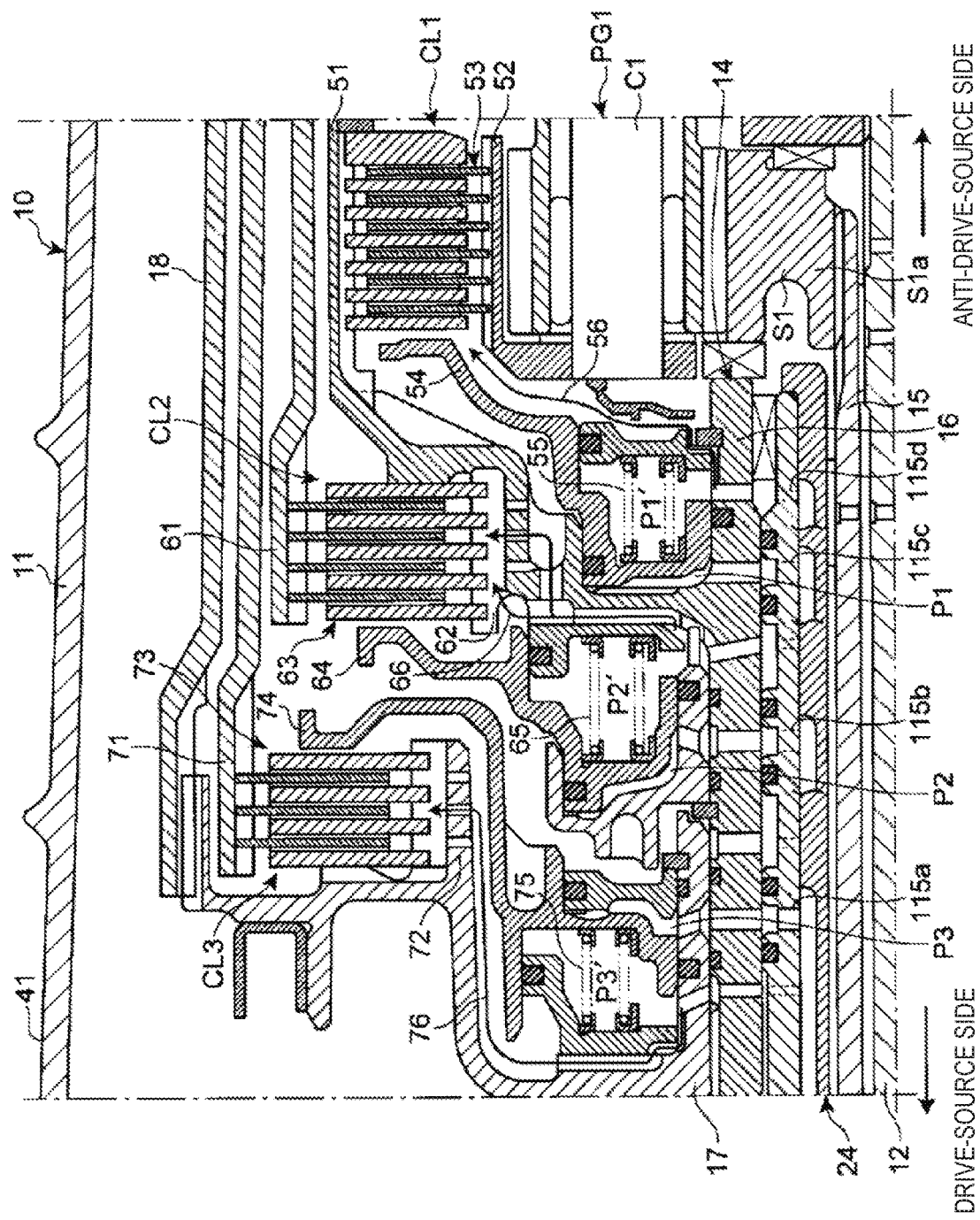
FIG. 4 is an enlarged cross-sectional view illustrating the periphery of clutches of the automatic transmission in FIG. 3.
Figure 5:
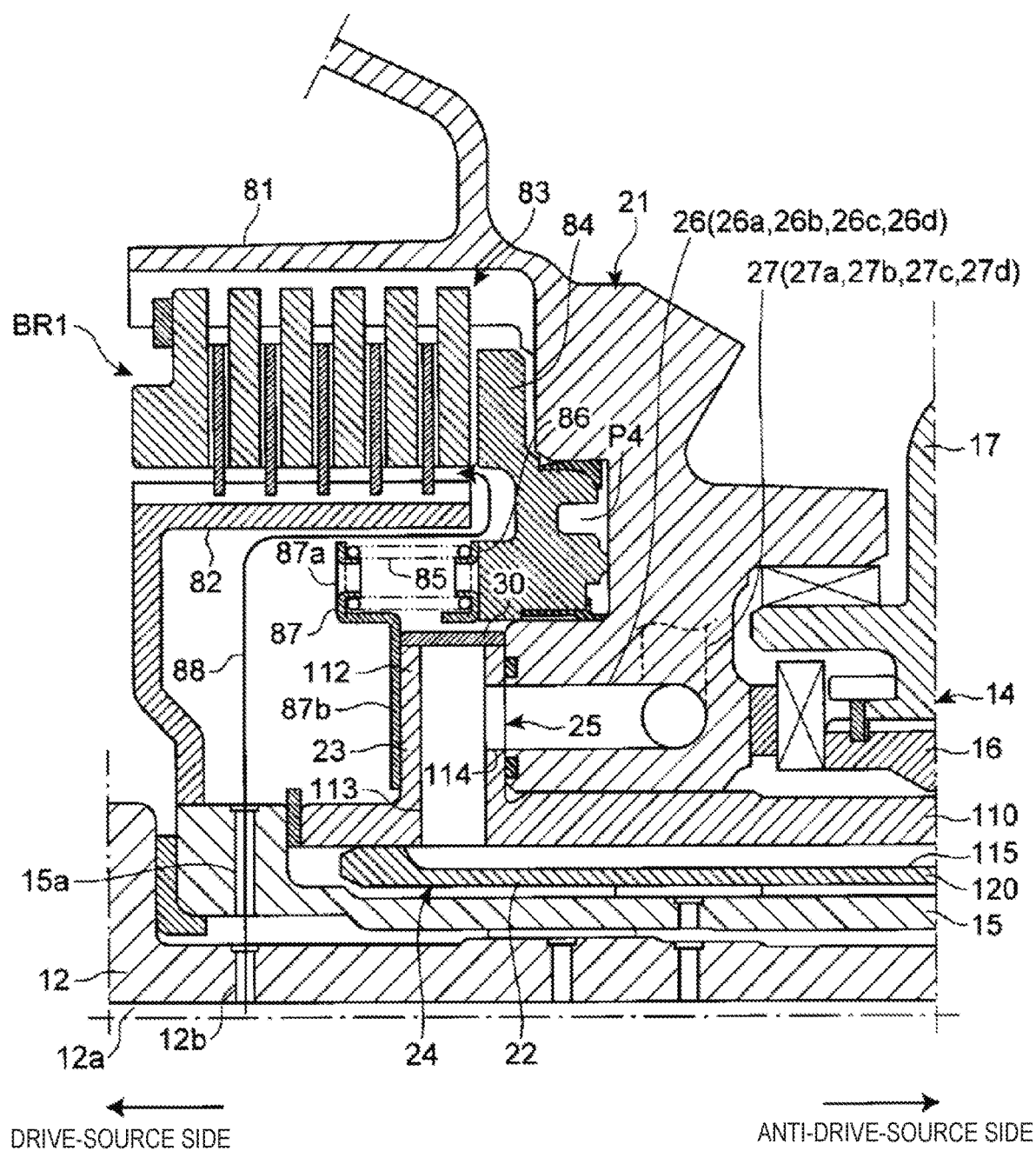
FIG. 5 is an enlarged cross-sectional view illustrating the periphery of a brake of the automatic transmission in FIG. 3.
Figure 6:
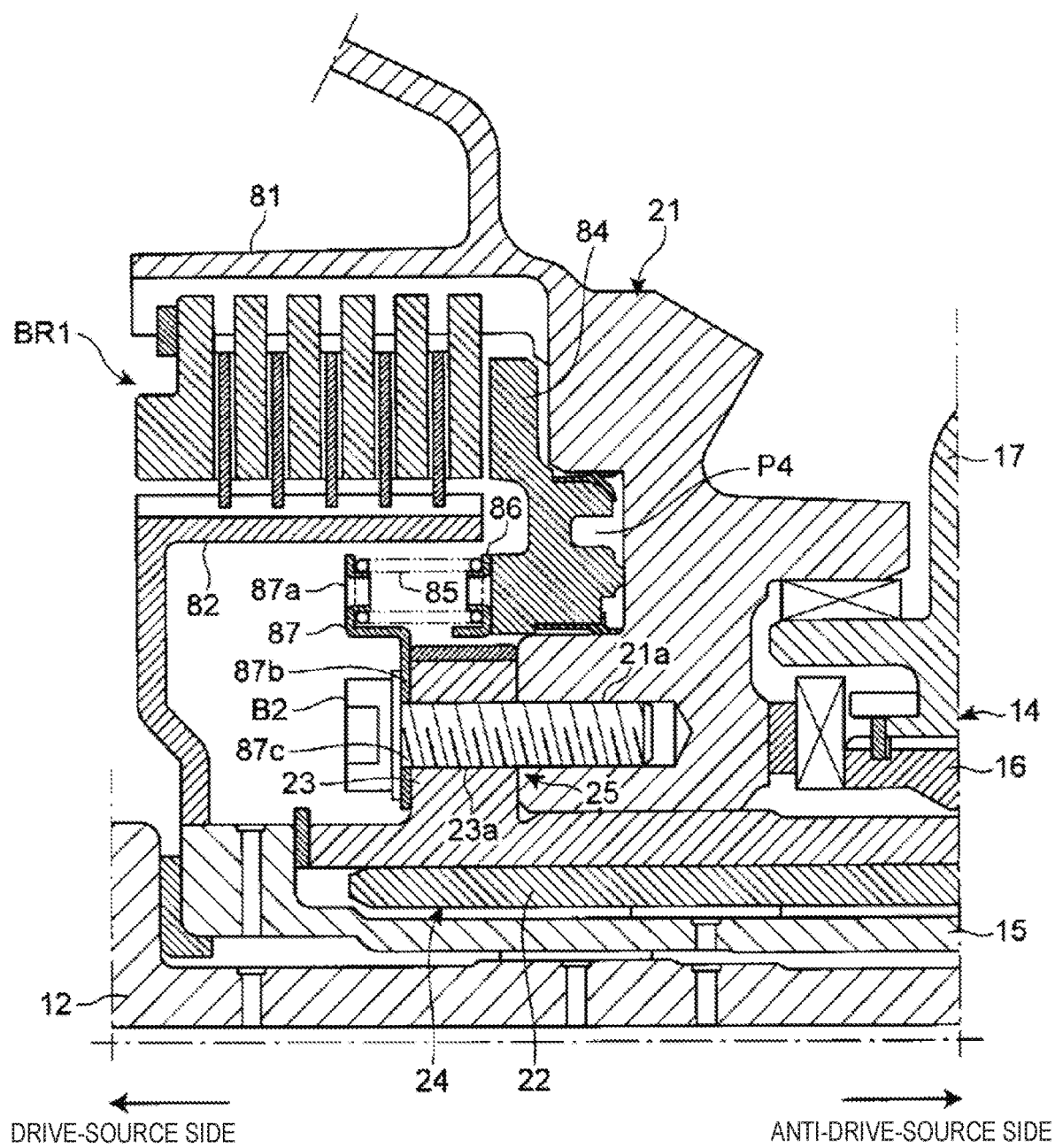
FIG. 6 is another enlarged cross-sectional view illustrating the periphery of the brake of the automatic transmission in FIG. 3.
Figure 7:
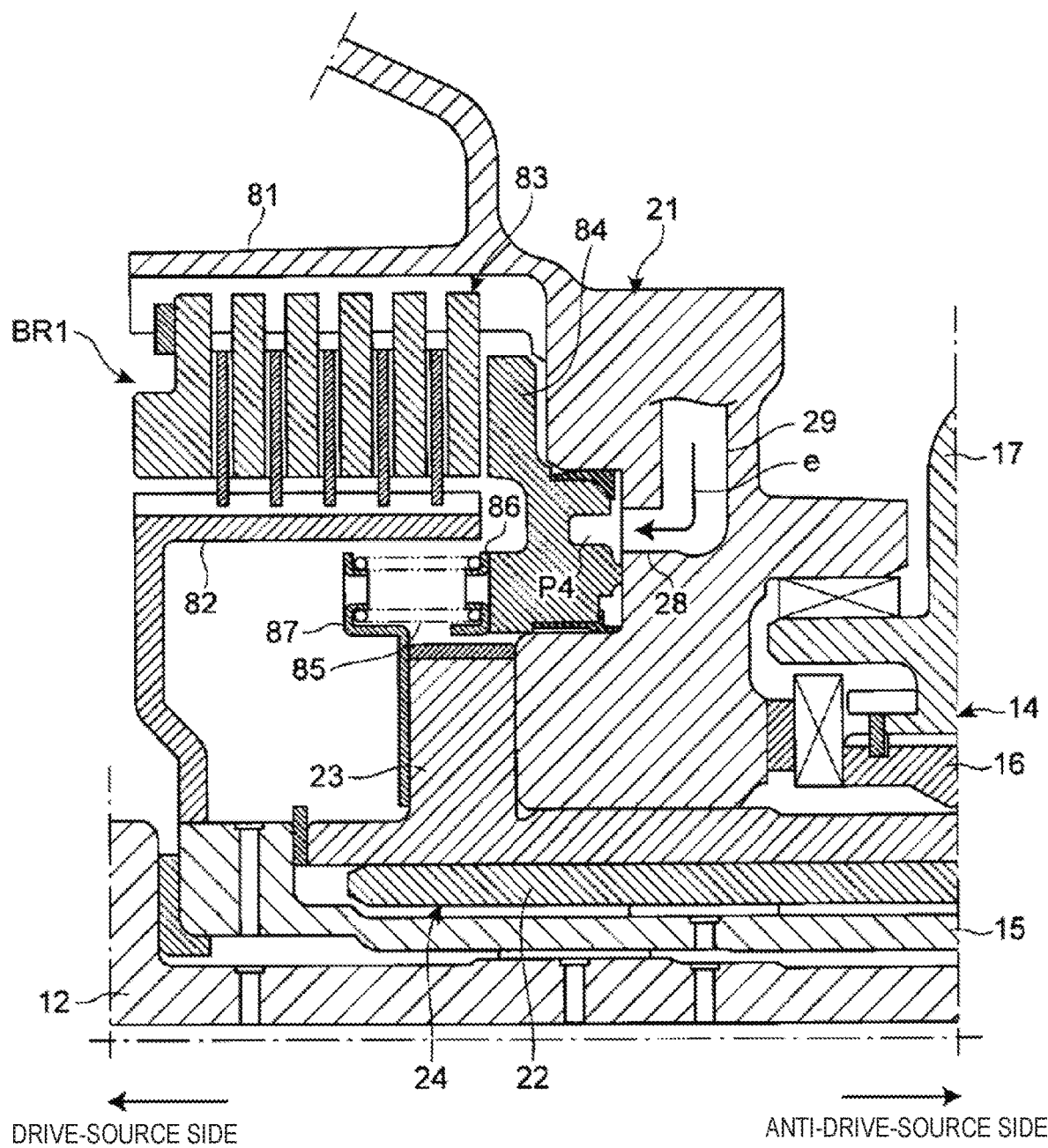
FIG. 7 is still another enlarged cross-sectional view illustrating the periphery of the brake of the automatic transmission in FIG. 3.

FIG. 4 is an enlarged cross-sectional view illustrating the periphery of the clutches of the automatic transmission in FIG. 3, FIG. 5 is an enlarged cross-sectional view illustrating the periphery of the brake of the automatic transmission in FIG. 3, and FIG. 6 is another enlarged cross-sectional view illustrating the periphery of the brake of the automatic transmission in FIG. 3. FIG. 7 is still another enlarged cross-sectional view illustrating the periphery of the brake of the automatic transmission in FIG. 3.

As illustrated in FIG. 4, the first, second, and third clutches CL1, CL2, and CL3 include drum members 51, 61, and 71 which are the outer rotating members, respectively, hub members 52, 62, and 72 which are the inner rotating members, a plurality of friction plates 53, 63, and 73 disposed between the drum members 51, 61, and 71 and the hub members 52, 62, and 72, respectively, pistons 54, 64, and 74 which press the plurality of friction plates 53, 63, and 73, respectively, and the hydraulic chambers P1, P2, and P3 to which hydraulic fluid for engagement for biasing the pistons 54, 64, and 74 in the friction-plate direction is supplied so that hydraulic pressure for engagement is supplied.

The first, second, and third clutches CL1, CL2, and CL3 are configured so that, when the hydraulic pressure for engagement is supplied to the hydraulic chambers P1, P2, and P3, the pistons 54, 64, and 74 press the friction plates 53, 63, and 73 to couple and engage the drum members 51, 61, and 71 and the hub members 52, 62, and 72, respectively.

The first, second, third clutches CL1, CL2, and CL3 have centrifugal balance chambers P1', P2', and P3' to which hydraulic fluid for biasing the pistons 54, 64, and 74 in the anti-friction-plate direction is supplied and which are formed on the opposite side of the hydraulic chambers P1, P2, and P3 having the pistons 54, 64, and 74 therebetween, respectively.

The centrifugal balance chambers P1', P2', and P3' are for preventing dragging of the friction plates 53, 63, and 73 by being pressed by the pistons 54, 64, and 74 in the friction-plate direction due to centrifugal forces which act on the hydraulic fluid inside the hydraulic chambers P1, P2, and P3 when disengaging the first, second, and third clutches CL1, CL2, and CL3, respectively. The centrifugal forces which act on the supplied hydraulic fluid generate biasing forces for biasing the pistons 54, 64, and 74 in the anti-friction-plate direction, and these biasing forces cancel the pressing forces in the friction-plate direction. Return springs 55, 65, and 75 which bias the pistons 54, 64, and 74 in the anti-friction-plate direction are disposed in the centrifugal balance chambers P1', P2', and P3', respectively.

As illustrated by arrows 56, 66, and 76, in the first, second, and third clutches CL1, CL2, and CL3, parts of the hydraulic fluid supplied to the centrifugal balance chambers P1', P2', and P3' are supplied to the friction plates 53, 63, and 73 of first, second, and third clutches CL1, CL2, and CL3, as the hydraulic fluid for lubrication, respectively.

In the automatic transmission 1, the hydraulic chambers P1, P2, and P3 of the first, second, and third clutches CL1, CL2, and CL3 are disposed at the outer circumferential side of the cylindrical body 22 of the sleeve 24 through the power transmission member 14. The centrifugal balance chambers P1', P2', and P3' of the first, second, third clutches CL1, CL2, CL3 are disposed at the opposite side of the hydraulic chambers P1, P2, and P3 having the pistons 54, 64, and 74 therebetween, respectively.

As illustrated in FIG. 5, the first brake BR1 includes a drum member 81 coupled to the vertical wall part 21 of the transmission case 11, a hub member 82 which is the rotating member, a plurality of friction plates 83 disposed between the drum member 81 and the hub member 82, a piston 84 which presses the plurality of friction plates 83, and the hydraulic chamber P4 to which hydraulic fluid for engagement for biasing the piston 84 in the friction-plate direction is supplied so that hydraulic pressure for engagement is supplied.

The first brake BR1 has a return spring 85 for biasing the piston 84 in the releasing direction. The return spring 85 is disposed at the drive-source side of the piston 84 which is disposed at the anti-drive-source side of the plurality of friction plates 83, and radially inward of the hub member 82.

An end part of the return spring 85 at the anti-drive-source side is supported at the drive-source side of the piston 84 through a first plate 86 which receives the return spring 85. An end part of the return spring 85 at the drive-source side is supported by the vertical wall part 21 of the transmission case 11 through a second plate 87 which receives the return spring 85.

The first plate 86 is formed annularly and provided with a spring guide part which projects cylindrically to the drive-source side and to which the return spring 85 is attached.

The second plate 87 is formed annularly and provided with a spring guide part which projects cylindrically to the anti-drive-source side and to which the return spring 85 is attached, at an outer circumferential part 87a. As illustrated in FIG. 6, a bolt insertion hole 87c extending axially is formed in an inner circumferential part 87b of the second plate 87. A bolt insertion hole 23a extending axially corresponding to the bolt insertion hole 87c is formed in the flange part 23 of the sleeve 24, and a threaded hole 21a extending axially corresponding to the bolt insertion hole 87c is formed in the vertical wall part 21 of the transmission case 11.

The second plate 87 is coupled to the vertical wall part 21 together with the sleeve 24 by threadedly engaging a fastening bolt B2 as a coupling member which couples the sleeve 24 to the vertical wall part 21 of the transmission case 11, with the threaded hole 21a of the vertical wall part 21 through the bolt insertion hole 87c of the second plate 87 and the bolt insertion hole 23a of the sleeve 24 from the drive-source side. The second plate 87 is coupled to the vertical wall part 21 together with the sleeve 24 by a plurality of fastening bolts B2 disposed at different locations in the circumferential direction.

As illustrated by an arrow 88 in FIG. 5, the hydraulic fluid for lubrication is supplied to the friction plates 83 of the first brake BR1 from the valve control unit through an axial oil passage 12a inside the input shaft 12, a radial oil passage 12b of the input shaft 12, and a radial oil passage 15a of the power transmission member 15.

The automatic transmission 10 includes the sleeve 24 having the cylindrical body 22 extending axially, radially inward of the vertical wall part 21 of the transmission case 11, and the flange part 23 coupled to the drive-source side of the vertical wall part 21, and the flange part 23 is disposed radially inward of the first brake BR1.

Figure 8:
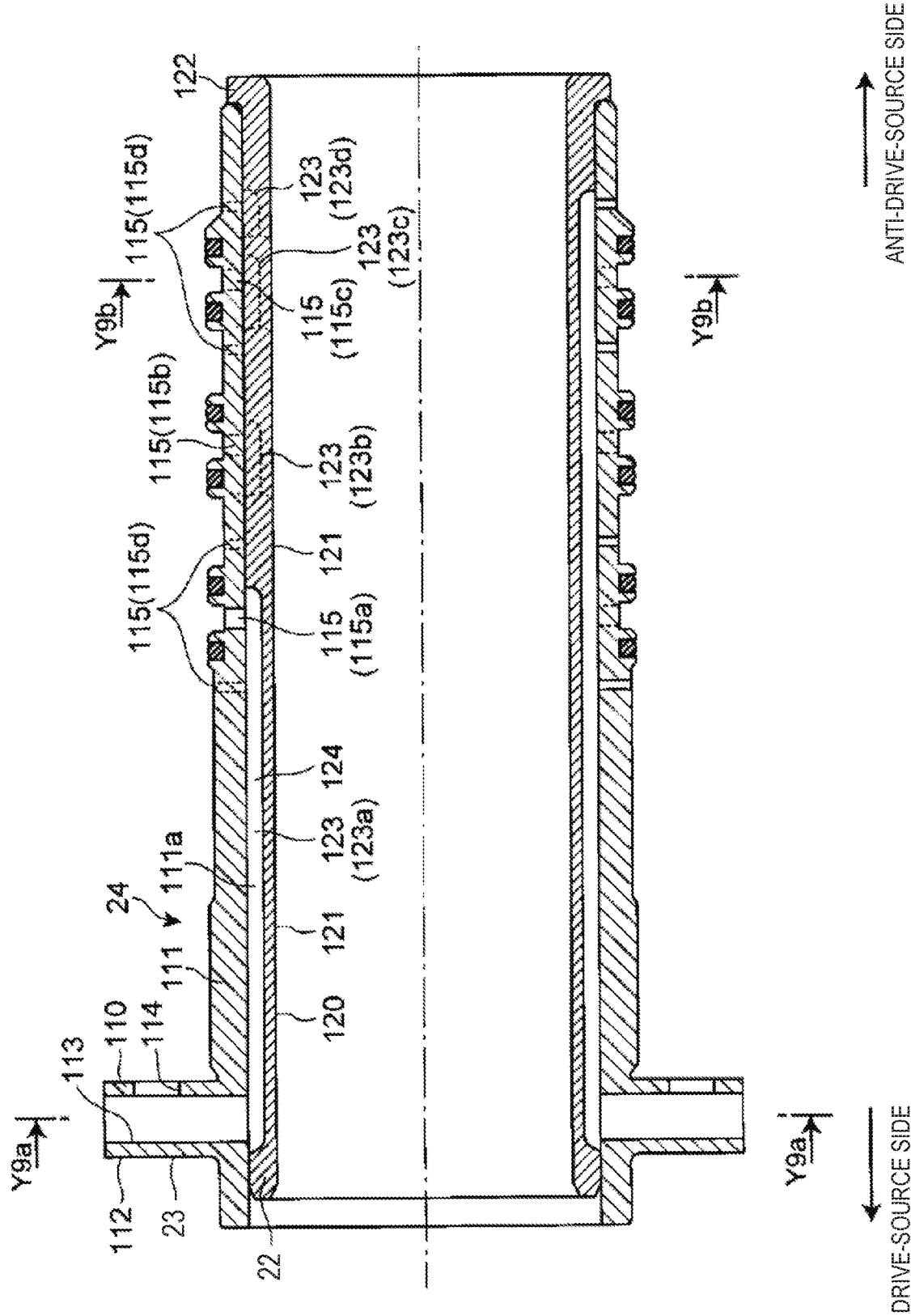
FIG. 8 is a cross-sectional view of a sleeve.
Figure 9A:
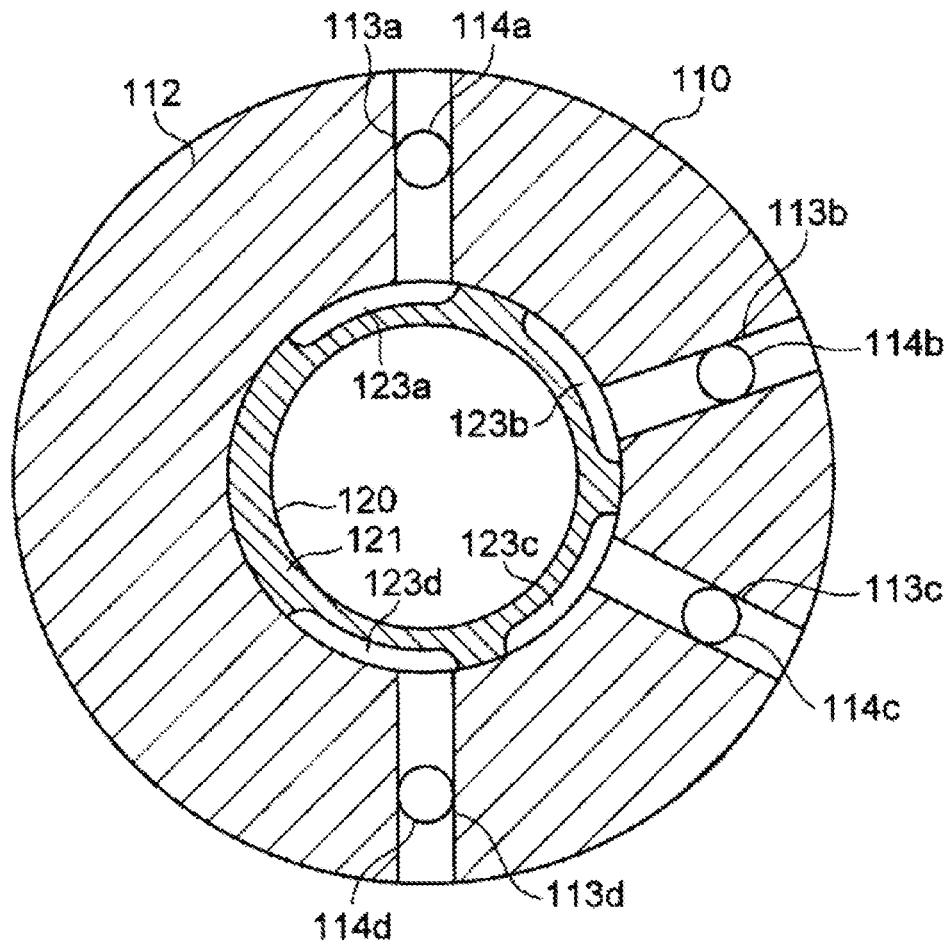
FIGS. 9A and 9B are cross-sectional views of the sleeve taken along lines Y9a-Y9a and Y9b-Y9b in FIG. 8, respectively.
Figure 9B:
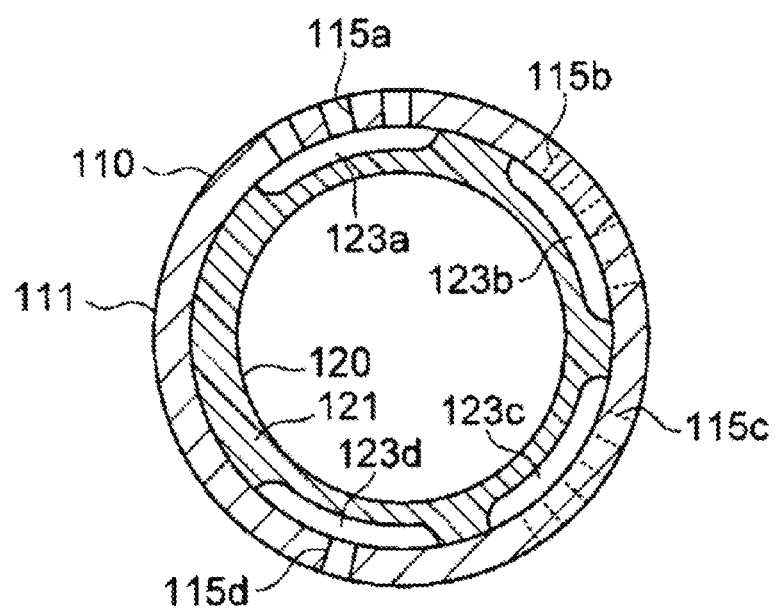
Figure 10:
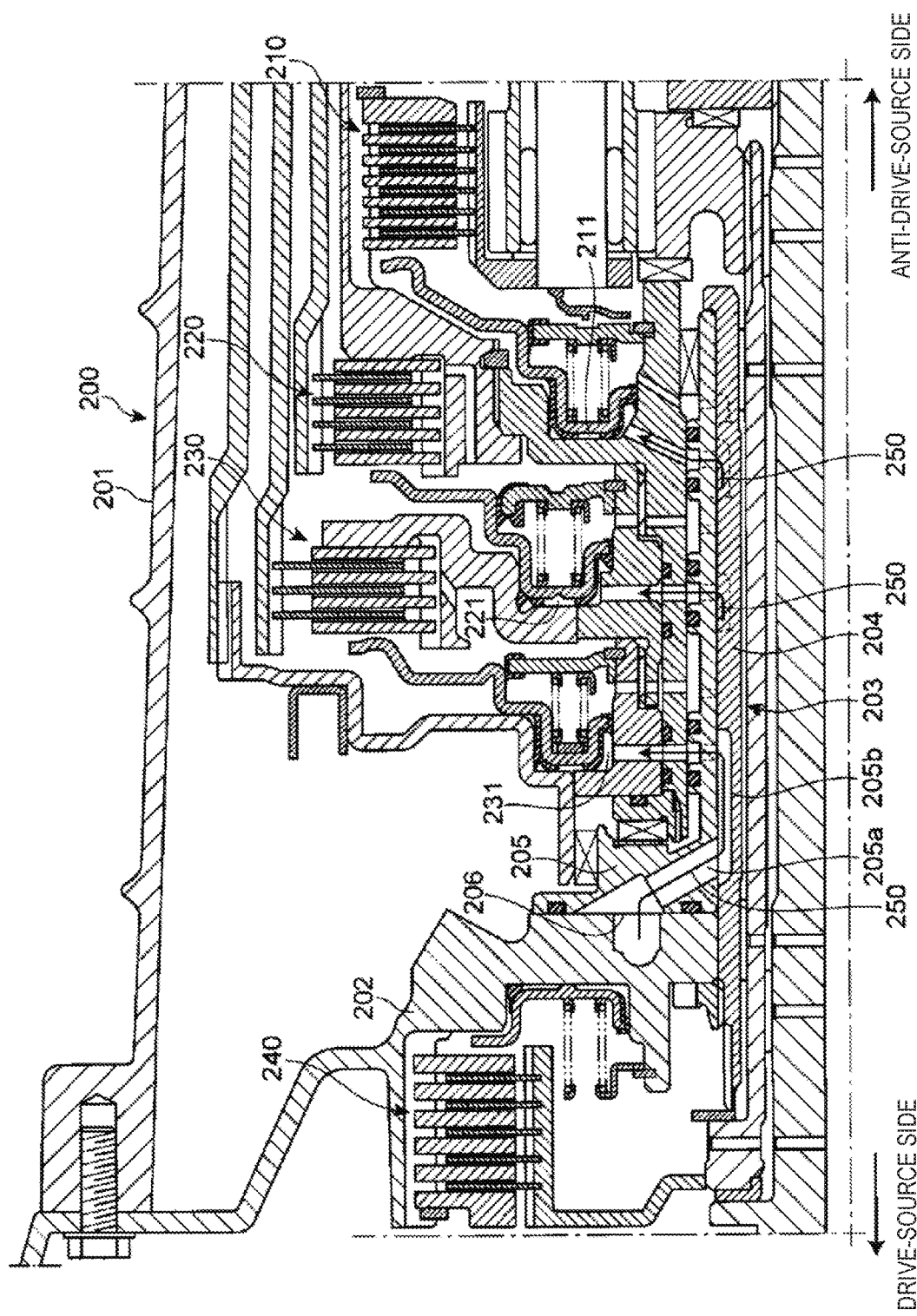
FIG. 10 is a cross-sectional view illustrating a vertical wall part of a conventional automatic transmission and the periphery thereof.

FIG. 8 is a cross-sectional view of the sleeve. FIGS. 9A and 9B are cross-sectional views of the sleeve taken along lines Y9a-Y9a and Y9b-Y9b in FIG. 8, respectively.

As illustrated in FIGS. 8, 9A and 9B, the sleeve 24 is comprised of a first sleeve 110 and a second sleeve 120 which is press-fitted into the first sleeve 110. The first sleeve 110 has a cylindrical body 111 (first cylindrical body) extending substantially cylindrical in the axial direction, and a flange part 112 extending radially outward from the drive-source side of the cylindrical body 111 and coupled to the drive-source side of the vertical wall part 21.

A radial oil passage 113 which extends radially in the flange part 112 and opens in an inner surface and an outer surface of the first sleeve 110 is formed in the first sleeve 110. In the first sleeve 110, an axial oil passage 114 which is connected to the radial oil passage 113, extends in the axial direction, and opens to the anti-drive-source side of the flange part 112 is formed in the flange part 112.

As illustrated in FIG. 9A, in the first sleeve 110, radial oil passages 113a, 113b, 113c, and 113d, and axial oil passages 114a, 114b, 114c, and 114d are formed at different locations in the circumferential direction, for the third clutch to supply the hydraulic fluid to the hydraulic chamber P3 of the third clutch CL3, for the second clutch to supply the hydraulic fluid to the hydraulic chamber P2 of the second clutch CL2, and for the first clutch to supply the hydraulic fluid to the hydraulic chamber P1 of the first clutch CL1, for lubrication to supply the hydraulic fluid to the centrifugal balance chambers P3', P2', and P1' of the third clutch CL3, the second clutch CL2, and the first clutch CL1, and to supply the hydraulic fluid to the friction plates 73, 63, and 53 of the third clutch CL3, the second clutch CL2, and the first clutch CL1, respectively.

As illustrated in FIG. 5, a closing member 30 formed annularly is press-fitted and attached onto the outer surface of the flange part 112 of the first sleeve 110. The closing member 30 is attached to the first sleeve 110 so as to close the radial oil passage 113 of the flange part 112 (in detail, openings of the radial oil passages 113a, 113b, 113c, and 113d).

As illustrated in FIG. 8, a radial oil passage 115 which extends in the radial direction at the anti-drive-source side of the cylindrical body 111 and is connected to the axial oil passage 114 is formed in the first sleeve 110. In the first sleeve 110, radial oil passages 115a, 115b, 115c, and 115d for the third clutch, the second clutch, the first clutch, and the lubrication are formed.

As illustrated in FIG. 4, the radial oil passages 115a, 115b, and 115c of the first sleeve 110 are connected to the hydraulic chamber P3 of the third clutch CL3, the hydraulic chamber P2 of the second clutch CL2, and the hydraulic chamber P1 of the first clutch CL1, respectively. The radial oil passages 115d of the first sleeve 110 are connected to the centrifugal balance chambers P3', P2', and P1' of the third, second, and first clutches CL3, CL2, CL1, respectively.

As illustrated in FIG. 8, the radial oil passages 115d, 115a, 115d, 115b, 115d, 115c, and 115d are formed in the first sleeve 110 in this order from the drive-source side to the anti-drive-source side. As illustrated in FIG. 9B, the radial oil passages 115a, 115b, 115c, and 115d of the first sleeve 110 are formed at different locations in the circumferential direction.

The second sleeve 120 has a cylindrical body 121 (second cylindrical body) extending substantially cylindrically in the axial direction. A flange part 122 extending radially outward is formed at the anti-drive-source side of the cylindrical body 121 of the second sleeve 120. The second sleeve 120 is configured so that the flange part 122 contacts the cylindrical body 111 of the first sleeve 110 when it is press-fitted into the first sleeve 110.

The second sleeve 120 is provided with a recess 124 for supplying hydraulic fluid which is recessed radially inward from an outer surface of the cylindrical body 121 and forms an axial oil passage 123 extending axially. The recess 124 for supplying hydraulic fluid of the second sleeve 120 is covered with the cylindrical body 111 of the first sleeve 110, and the axial oil passage 123 is formed between an inner surface 111a of the cylindrical body 111 of the first sleeve 110 and the outer surface of the cylindrical body 121 of the second sleeve 120.

Axial oil passages 123a, 123b, 123c, and 123d for the third clutch, the second clutch, the first clutch, and the lubrication are formed in the second sleeve 120, respectively. The axial oil passages 123a, 123b, 123c, and 123d of the second sleeve 120 are formed at different locations in the circumferential direction.

The axial oil passage 123 of the second sleeve 120 is connected to the radial oil passage 113 and the radial oil passage 115 of the first sleeve 110. The axial oil passages 123a, 123b, 123c, and 123d of the second sleeve 120 are connected to the radial oil passages 113a, 113b, 113c, and 113d of the first sleeve 110, and connected to the radial oil passages 115a, 115b, 115c, and 115d of the first sleeve 110, respectively.

The sleeve 24 is formed by the first sleeve 110 and the second sleeve 120, the cylindrical body 22 is formed by the cylindrical body 111 of the first sleeve 110 and the cylindrical body 121 of the second sleeve 120, and the flange part 23 is formed by the flange part 112 of the first sleeve 110.

As illustrated in FIG. 5, an axial oil passage 26 which is connected to the axial oil passage 114 of the sleeve 24 and extends in the axial direction is formed in the vertical wall part 21 of the transmission case 11. A radial oil passage 27 which is connected to the axial oil passage 26, extends radially outward, and is connected to the control valve unit is formed in the vertical wall part 21 of the transmission case 11.

Axial oil passages 26a, 26b, 26c, and 26d and radial oil passages 27a, 27b, 27c, and 27d which are connected to the axial oil passages 114a, 114b, 114c, and 114d for the third clutch, the second clutch, the first clutch, and the lubrication are formed in the vertical wall part 21 of the transmission case 11, respectively.

The oil supply passages a, b, c, and d which supply the hydraulic fluid to the clutches CL3, CL2, and CL1 supply the hydraulic fluid from the vertical wall part 21 to radially inward of the clutches CL3, CL2, and CL1 through the first oil passages 26 and 114 which extend in the axial direction through a coupling part 25 between the vertical wall part 21 and the flange part 23 of the sleeve 24, the second oil passage 113 inside the flange part 23 which is connected to the first oil passages 26 and 114 and extends in the radial direction, and the third oil passage 123 inside the cylindrical body 22 of the sleeve 24 which is connected to the second oil passage 113 and extends in the axial direction.

The coupling part 25 between the vertical wall part 21 of the transmission case 11 and the flange part 23 of the sleeve 24 is comprised of the anti-drive-source side of the vertical wall part 21 and the drive-source side of the flange part 23 which are coupled to each other by the fastening bolts B2.

As illustrated in FIG. 3, the oil supply passage a which supplies the hydraulic fluid to the hydraulic chamber P3 of the third clutch CL3 supplies the hydraulic fluid from the vertical wall part 21 to radially inward of the third clutch CL3 through the first oil passages 26a and 114a which extend in the axial direction through the coupling part 25 between the vertical wall part 21 and the flange part 23, the second oil passage 113a inside the flange part 23 which is connected to the first oil passages 26a and 114a and extends in the radial direction, and the third oil passage 123a inside the cylindrical body 22 which is connected to the second oil passage 113a and extends in the axial direction.

The oil supply passage b which supplies the hydraulic fluid to the hydraulic chamber P2 of the second clutch CL2 supplies the hydraulic fluid from the vertical wall part 21 to radially inward of the third clutch CL3 through the first oil passages 26b and 114b which extend in the axial direction through the coupling part 25 between the vertical wall part 21 and the flange part 23, the second oil passage 113b inside the flange part 23 which is connected to the first oil passages 26b and 114b and extends in the radial direction, and the third oil passage 123b inside the cylindrical body 22 which is connected to the second oil passage 113b and extends in the axial direction.

The oil supply passage c which supplies the hydraulic fluid to the hydraulic chamber P1 of the first clutch CL1 supplies the hydraulic fluid from the vertical wall part 21 to radially inward of the third clutch CL3 through the first oil passages 26c and 114c which extend in the axial direction through the coupling part 25 between the vertical wall part 21 and the flange part 23, the second oil passage 113c inside the flange part 23 which is connected to the first oil passages 26c and 114c and extends in the radial direction, and the third oil passage 123c inside the cylindrical body 22 which is connected to the second oil passage 113c and extends in the axial direction.

The oil supply passage d which supplies the hydraulic fluid to the centrifugal balance chambers P3', P2', and P1' and the friction plate 73, 63, and 53 of the third clutch CL3, the second clutch CL2, and the first clutch CL1 supplies the hydraulic fluid from the vertical wall part 21 to radially inward of the third clutch CL3, the second clutch CL2, and the first clutch CL1 through the first oil passages 26d and 114d which extend in the axial direction through the coupling part 25 between the vertical wall part 21 and the flange part 23, the second oil passage 113d inside the flange part 23 which is connected to the first oil passages 26d and 114d and extends in the radial direction, and the third oil passage 123d inside the cylindrical body 22 which is connected to the second oil passage 113d and extends in the axial direction.

As illustrated in FIG. 7, an axial oil passage 28 and a radial oil passage 29 for the first brake which supply the hydraulic fluid to the hydraulic chamber P4 of the first brake BR1 are formed in the vertical wall part 21 of the transmission case 11. The axial oil passage 28 for the first brake is connected to the hydraulic chamber P4 of the first brake BR1 and extends in the axial direction, and the radial oil passage 29 for the second brake is connected to the axial oil passage 28 for the first brake, is connected to the control valve unit, and extends in the radial direction.

The oil supply passage e which supplies the hydraulic fluid to the hydraulic chamber P4 of the first brake BR1 supplies the hydraulic fluid from the control valve unit to the hydraulic chamber P4 of the first brake BR1 through the axial oil passage 28 and the radial oil passage 29.

In the automatic transmission 10, the clutches CL1, CL2, and CL3 are disposed on one side of the vertical wall part 21 of the transmission case 11 in the axial direction, and the brake BR1 as the given component is disposed on the other side of the vertical wall part 21 in the axial direction. The hydraulic fluid is supplied from the vertical wall part 21 of the transmission case 11 to radially inward of the clutches CL1, CL2, and CL3 through the flange part 23 and the cylindrical body 22 of the sleeve 24, and the flange part 23 is disposed radially inward of the first brake BR1.

In the automatic transmission 10, the sleeve 24 (in detail, the first sleeve 110 and the second sleeve 120) is made of a ferrous material, and the transmission case 11 is made of an aluminum-based material. Since the sleeve 24 and the transmission case 11 differ in dimensional change due to thermal expansion, it is difficult to form an oil supply passage through a fitting part between the vertical wall part 21 of the transmission case 11 and the sleeve 24. Therefore, the oil supply passages to the clutches CL1, CL2, and CL3 are formed through the coupling part 25 between the transmission case 11 and the sleeve 24.

In this embodiment, the hydraulic fluid is supplied from radially inward to the three clutches CL1, CL2, and CL3 disposed on one side of the vertical wall part 21 of the transmission case 11 in the axial direction, through the flange part 23 and the cylindrical body 22 of the sleeve 24 from the vertical wall part 21 of the transmission case 11. However, the hydraulic fluid may be supplied from radially inward to at least one of clutches disposed on one side of the vertical wall part 21 in the axial direction.

Thus, in this embodiment, the automatic transmission 10 in which the clutches CL1, CL2, and CL3 are disposed on one side of the vertical wall part 21 of the transmission case 11 in the axial direction is provided with the sleeve 24 having the cylindrical body 22 extending in the axial direction radially inward of the vertical wall part 21, and the flange part 23 coupled to the other side of the vertical wall part 21 in the axial direction. The flange part 23 is disposed radially inward of the given component (brake BR1) disposed on the other side of the vertical wall part 21 in the axial direction. The oil supply passages a, b, c, and d which supply the hydraulic fluid to the clutches CL1, CL2, and CL3 supply the hydraulic fluid from the vertical wall part 21 to radially inward of the clutches CL1, CL2, and CL3 through the first oil passages 26 and 114 which extend in the axial direction through the coupling part 25 between the vertical wall part 21 and the flange part 23, the second oil passage 113 inside the flange part 23 which is connected to the first oil passages 26 and 114 and extends in the radial direction, and the third oil passage 123 inside the cylindrical body 22 which is connected to the second oil passage 113 and extends in the axial direction.

Thus, compared to a case where the flange part 23 of the sleeve 24 which constitutes the oil supply passages a, b, c, and d which supply the hydraulic fluid from radially inward to the clutches CL1, CL2, and CL3 is disposed on one side of the transmission case 11 in the axial direction, the axial dimension is reduced since the flange part 23 is disposed so as to overlap in the axial direction of the transmission case 11 with the given component (brake BR1) which is disposed on the other side of the vertical wall part 21 in the axial direction. Therefore, the automatic transmission 10 in which the clutches CL1, CL2, and CL3 are disposed on one side of the vertical wall part 21 of the transmission case 11 in the axial direction can be downsized in the axial direction, while supplying the hydraulic fluid from radially inward to the clutches CL1, CL2, and CL3 through the vertical wall part 21.

The given component is the brake BR1. Therefore, in the automatic transmission 10 in which the clutches CL1, CL2, and CL3 are disposed on one side of the vertical wall part 21 of the transmission case 11 in the axial direction and the brake BR1 is disposed on the other side of the vertical wall part 21 in the axial direction, the flange part 23 of the sleeve 24 is disposed so as to overlap with the brake BR1 in the axial direction, thereby reducing the axial dimension.

The sleeve 24 includes the first sleeve 110 having the first cylindrical body 111 which constitutes the outer circumferential side of the cylindrical body 22, and the flange part 23, and the second sleeve 120 having the second cylindrical body 121 which constitutes an inner circumferential side of the flange part 23 and is attached to an inner surface of the first cylindrical body 111. The third oil passage 123 is formed between the inner surface of the first cylindrical body 111 and an outer surface of the second cylindrical body 121.

Therefore, the third oil passage 123 is formed between the inner surface of the first cylindrical body 111 and the outer surface of the second cylindrical body 121 by attaching the second sleeve 120 to the first sleeve 110, and therefore, the third oil passage 123 can be formed comparatively easily. Particularly, when a plurality of third oil passages 123 are formed in the sleeve 24, a plurality of third oil passages 123 can be formed comparatively easily.

The oil supply passages a, b, c, and d include the plurality of oil supply passages a, b, and c which supply the hydraulic fluid for engagement to the plurality of clutches CL1, CL2, and CL3. Therefore, the hydraulic fluid for engagement can be supplied from radially inward to the plurality of clutches CL1, CL2, and CL3 disposed on one side of the vertical wall part 21 of the transmission case 11 in the axial direction, while downsizing the automatic transmission 10 in the axial direction.

The oil supply passages a, b, c, and d include the oil supply passage d which supplies the hydraulic fluid for lubrication to the plurality of clutches CL1, CL2, and CL3. Therefore, the hydraulic fluid for lubrication can be supplied from radially inward to the plurality of clutches CL1, CL2, and CL3 disposed on one side of the vertical wall part 21 of the transmission case 11 in the axial direction, while downsizing the automatic transmission 10 in the axial direction.

The coupling member B2, which couples the sleeve 24, also couples the plate 87 which receives the return spring 85 of the brake BR1 to the vertical wall part 21. Therefore, it is not necessary to separately provide a coupling member which couples the plate 87 which receives the return spring 85, and the number of components and the number of assembling processes can be reduced.

In this embodiment, the hydraulic fluid is supplied from the vertical wall part 21 of the transmission case 11 to radially inward of the clutches CL1, CL2, and CL3 through the flange part 23 and the cylindrical body 22 of the sleeve 24, and the flange part 23 is disposed radially inward of the first brake BR1. However, when other components, such as a damper, a pump, and a motor, are disposed on the other side of the transmission case 11 in the axial direction, the flange part 23 may be disposed radially inward of the other components.

The present disclosure is not limited to the illustrated embodiment, and various improvements and design alterations are possible without departing from the spirit of the present disclosure.

As described above, according to the present disclosure, since the automatic transmission in which the clutch is disposed on one side of the vertical wall part of the transmission case in the axial direction can be constituted compactly in the axial direction, while being capable of supplying the hydraulic fluid from radially inward to the clutch through the vertical wall part, it may be utilized suitably in the manufacturing technology field of this type of automatic transmissions and vehicles which carry the automatic transmissions.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Automatic Transmission
11 Transmission Case
21, 35 Vertical Wall Part
22 Cylindrical Body of Sleeve
23 Flange Part of Sleeve
24 Sleeve
25 Coupling Part
85 Return Spring
86, 87 Plate
110 First Sleeve
120 Second Sleeve
a, b, c, d Oil Supply Passage
B1, B2 Coupling Member
BR1, BR2 Brake
CL1, CL2, CL3 Clutch

What is claimed is:
1. An automatic transmission, comprising:
a transmission case having a vertical wall part;
a clutch disposed on a first side of the vertical wall part in an axial direction of the transmission case;
a given component disposed on a second side of the vertical wall part in the axial direction;
a sleeve having a cylindrical body extending in the axial direction to the first side and to the second side of the vertical wall part, at a location radially inward of the vertical wall part, and a flange part extending radially outward from the cylindrical body and coupled to the vertical wall part from the second side in the axial direction, the flange part being disposed radially inward of the given component; and
an oil supply passage through which hydraulic fluid is supplied to the clutch,
wherein the hydraulic fluid is supplied to the clutch from radially inward of the clutch through the vertical wall part,
wherein the oil supply passage is configured to supply the hydraulic fluid from the vertical wall part to the radially inward of the clutch through a first oil passage extending in the axial direction via a coupling part between the vertical wall part and the flange part, a second oil passage inside the flange part, connected to the first oil passage and extending in the radial direction, and a third oil passage inside the cylindrical body, connected to the second oil passage and extending in the axial direction, and wherein a position of the flange part in the axial direction is configured to overlap with a position of the given component in the axial direction.

2. The automatic transmission of claim 1, wherein the given component is a brake.

3. The automatic transmission of claim 1, wherein the sleeve includes a first sleeve having a first cylindrical body constituting an outer circumferential side of the cylindrical body, and the flange part, and a second sleeve having a second cylindrical body constituting an inner circumferential side of the cylindrical body and attached to an inner surface of the first cylindrical body, and wherein the third oil passage is formed between the inner surface of the first cylindrical body and an outer surface of the second cylindrical body.

4. The automatic transmission of claim 1, wherein the clutch includes a plurality of clutches disposed on the first side of the vertical wall part in the axial direction, and wherein the oil supply passage includes a plurality of oil supply passages through which hydraulic fluid for engagement is supplied to the plurality of clutches, respectively.

5. The automatic transmission of claim 1, wherein the clutch includes a plurality of clutches disposed on the first side of the vertical wall part in the axial direction, and wherein the oil supply passage includes an oil supply passage through which hydraulic fluid for lubrication is supplied to the plurality of clutches.

6. The automatic transmission of claim 1, wherein a plate configured to receive a return spring of a brake that is the given component is coupled to the vertical wall part, together with the sleeve, by a coupling member configured to couple the sleeve.

7. The automatic transmission of claim 2, wherein the sleeve includes a first sleeve having a first cylindrical body constituting an outer circumferential side of the cylindrical body, and the flange part, and a second sleeve having a second cylindrical body constituting an inner circumferential side of the cylindrical body and attached to an inner surface of the first cylindrical body, and wherein the third oil passage is formed between the inner surface of the first cylindrical body and an outer surface of the second cylindrical body.

8. The automatic transmission of claim 2, wherein the clutch includes a plurality of clutches disposed on the first side of the vertical wall part in the axial direction, and wherein the oil supply passage includes a plurality of oil supply passages through which hydraulic fluid for engagement is supplied to the plurality of clutches, respectively.

9. The automatic transmission of claim 2, wherein the clutch includes a plurality of clutches disposed on the first side of the vertical wall part in the axial direction, and wherein the oil supply passage includes an oil supply passage through which hydraulic fluid for lubrication is supplied to the plurality of clutches.

10. The automatic transmission of claim 2, wherein a plate configured to receive a return spring of a brake that is the given component is coupled to the vertical wall part, together with the sleeve, by a coupling member configured to couple the sleeve.

11. The automatic transmission of claim 3, wherein the clutch includes a plurality of clutches disposed on the first side of the vertical wall part in the axial direction, and wherein the oil supply passage includes a plurality of oil supply passages through which hydraulic fluid for engagement is supplied to the plurality of clutches, respectively.

12. The automatic transmission of claim 3, wherein the clutch includes a plurality of clutches disposed on the first side of the vertical wall part in the axial direction, and wherein the oil supply passage includes an oil supply passage through which hydraulic fluid for lubrication is supplied to the plurality of clutches.

13. The automatic transmission of claim 3, wherein a plate configured to receive a return spring of a brake that is the given component is coupled to the vertical wall part, together with the sleeve, by a coupling member configured to couple the sleeve.

14. The automatic transmission of claim 4, wherein a plate configured to receive a return spring of a brake that is the given component is coupled to the vertical wall part, together with the sleeve, by a coupling member configured to couple the sleeve.

15. The automatic transmission of claim 5, wherein a plate configured to receive a return spring of a brake that is the given component is coupled to the vertical wall part, together with the sleeve, by a coupling member configured to couple the sleeve.

16. The automatic transmission of claim 7, wherein the clutch includes a plurality of clutches disposed on the first side of the vertical wall part in the axial direction, and wherein the oil supply passage includes a plurality of oil supply passages through which hydraulic fluid for engagement is supplied to the plurality of clutches, respectively.

17. The automatic transmission of claim 7, wherein the clutch includes a plurality of clutches disposed on the first side of the vertical wall part in the axial direction, and wherein the oil supply passage includes an oil supply passage through which hydraulic fluid for lubrication is supplied to the plurality of clutches.

18. The automatic transmission of claim 17, wherein a plate configured to receive a return spring of a brake that is the given component is coupled to the vertical wall part, together with the sleeve, by a coupling member configured to couple the sleeve.

\* \* \* \* \*